(12) United States Patent
Egi

(10) Patent No.: US 11,513,497 B2
(45) Date of Patent: Nov. 29, 2022

(54) CONTROL DEVICE

(71) Applicant: OMRON Corporation, Kyoto (JP)

(72) Inventor: Mamoru Egi, Otsu (JP)

(73) Assignee: OMRON CORPORATION, Kyoto (JP)

( * ) Notice: Subject to any disclaimer, the term of this patent is extended or adjusted under 35 U.S.C. 154(b) by 335 days.

(21) Appl. No.: 16/644,179

(22) PCT Filed: Dec. 12, 2018

(86) PCT No.: PCT/JP2018/045694
§ 371 (c)(1),
(2) Date: Mar. 4, 2020

(87) PCT Pub. No.: WO2019/117202
PCT Pub. Date: Jun. 20, 2019

(65) Prior Publication Data
US 2020/0201291 A1   Jun. 25, 2020

(30) Foreign Application Priority Data

Dec. 15, 2017   (JP) .............................. JP2017-240764

(51) Int. Cl.
*G05B 19/4155* (2006.01)
*G06N 5/02* (2006.01)

(52) U.S. Cl.
CPC .......... *G05B 19/4155* (2013.01); *G06N 5/02* (2013.01); *G05B 2219/42058* (2013.01)

(58) Field of Classification Search
CPC ...... G05B 19/4155; G05B 2219/42058; G05B 2219/39195; G05B 13/048; G06N 5/02; B25J 9/163
See application file for complete search history.

(56) References Cited

FOREIGN PATENT DOCUMENTS

EP         1315054 A1    5/2003
JP      H04-033102 A    2/1992
            (Continued)

OTHER PUBLICATIONS

Ohtsuka et al., "Practical applications of control by real-time optimization", Book (ISBN: 978-4-339-03210-9), 2015 pp. 1-21, Corona Publishing Co., Ltd., Tokyo; relevance is indicated in the (translated) ISR/WO dated Mar. 19, 2019.

(Continued)

*Primary Examiner* — Christopher E. Everett
(74) *Attorney, Agent, or Firm* — Metrolex IP Law Group, PLLC

(57) ABSTRACT

The present invention is a control device which includes a filter unit for performing an attenuation process at a predetermined frequency on a control input based on a predetermined target command, generates the control input through model predictive control executed by a model predictive control unit and causes an output of a predetermined control object to follow the predetermined target command. A prediction model defines a correlation between the control input and predetermined extended state variables including a state variable related to a predetermined control object and a predetermined filter state variable related to the filter unit, and a predetermined evaluation function for model predictive controls configured to calculate a state quantity cost that is a stage cost with respect to state variables except the predetermined filter state variable among the predetermined extended state variables, and a control input cost that is a stage cost related to the control input.

6 Claims, 16 Drawing Sheets

(56) References Cited

FOREIGN PATENT DOCUMENTS

JP  H10-161706 A  6/1998
JP  2014-119797 A  6/2014

OTHER PUBLICATIONS

Ohtsuka, "A continuation/GMRES method for fast computation of nonlinear receding horizon control", Automatica, 2004, pp. 563-574, vol. 40, Issue 4, Elsevier; relevance is indicated in the (translated) ISR/WO dated Mar. 19, 2019.

Ohtsuka, "Calculus of Variations and Optimal Control for Advanced Control—For Beginners—(Part 1)", Journal of the Society of Instrument and Control Engineers, 2006, pp. 899-907, vol. 45, No. 10, The Society of Instrument and Control Engineers; relevance is indicated in the (translated) ISR/WO dated Mar. 19, 2019.

Igarashi et al., "Two DOF Control of Servo Motor using Model Predictive Control in Reference Model", Proceedings of the 54th Annual Conference of the Institute of Systems, 2010, pp. 177-178, The Institute of Systems, Control and Information Engineers; relevance is indicated in the (translated) ISR/WO dated Mar. 19, 2019.

Sakurai, et al., "Offset Compensation of Continuous Time Model Predictive Control by Disturbance Estimation", Transactions of the Institute of Systems, Control and Information Engineers, 2012, pp. 172-180, vol. 25, No. 7, The Institute of Systems, Control and Information Engineers; concise explanation of relevance provided in the specification; relevance is indicated in the (translated) ISR/WO dated Mar. 19, 2019.

Maeder et al., "Linear offset-free Model Predictive Control", Automatica, 2009, pp. 2214-2222, vol. 45, Issue 10, Elsevier; concise explanation of relevance provided in the specification; relevance is indicated in the (translated) ISR/WO dated Mar. 19, 2019.

An English translation of the International Search Report("ISR") of PCT/JP2018/045694 dated Mar. 19, 2019.

An English translation of the Written Opinion("WO") of PCT/JP2018/045694 dated Mar. 19, 2019.

The partial supplementary European search report dated Jul. 20, 2021 in a counterpart European patent application.

CONTROL DEVICE

TECHNICAL FIELD

The present invention relates to a control device for causing a control object to follow a predetermined target command.

BACKGROUND ART

To cause a control object to move while following a command trajectory, feedback control is generally used. For example, in an articulated robot, a servo motor of each joint shaft is controlled such that a robot control device causes the position of a fingertip portion of the robot to follow a command trajectory set (instructed) in advance using feedback control. However, general feedback control has a problem that an actual trajectory of a robot deviates from a command trajectory because response delay inevitably occurs in each servo motor. In order to prevent such deviation with respect to a command trajectory, a technology with respect to model predictive control is used.

However, even when model predictive control is used, steady-state deviation may be generated when a target constantly changes as in follow-up control. Accordingly, it is conceivable to remove steady-state deviation by serially connecting an integrator to a compensator when model predictive control is used. In addition, it is possible to remove assumed disturbance in principle by regarding the disturbance as a new state and incorporating it into a model. For example, in NPL 1 and 2, methods of constructing a disturbance observer and canceling steady-state deviation using disturbance estimated by the disturbance observer are proposed.

CITATION LIST

Non Patent Literature

NPL 1: Yuta Sakurai and Toshiyuki Ohtsuka: Offset Compensation of Continuous Time Model Predictive Control By Disturbance Estimation; Journal of Institute of Systems, Control and Information Engineers, Vol. 25, No. 7, pp. 10-18 (2012)

NPL 2: U. Maeder and M. Morari: Linear offset-free model predictive control; Automatica, Vol. 45, No. 10, pp. 2214-2222 (2009)

SUMMARY OF INVENTION

Technical Problem

To cause an output of a control object to suitably follow a target command, it is necessary to suppress vibration that may occur during positioning thereof. Even if positioning is performed at a high speed according to the target command, a time required to finally complete positioning increases when vibration occurs immediately before the positioning and thus followability also deteriorates. Accordingly, terminal state control is known as a technology for preventing such vibration during positioning, but this control is a method of controlling a terminal state at a predetermined time according to feedforward input. Therefore, it is necessary to determine a control input to a control object in advance when terminal state control is used and it is difficult to promote suitable vibration suppression if a target command changes in real time during operation of the control object.

An object of the present invention devised in view of such problems is to provide a technology for enabling suitable vibration suppression irrespective of change in a target command during operation of a control object even when an output of the control object is caused to follow the target command.

Solution to Problem

To accomplish the aforementioned object, the present invention employs a technology with respect to model predictive control in vibration suppression in follow-up control for a target command. Accordingly, following a target command is realized while promoting vibration suppression and coping with real-time change in the target command.

Specifically, the present invention is a control device for causing an output of a predetermined control object to follow a predetermined target command which includes: a filter unit which performs an attenuation process at a predetermined frequency on a control input based on the predetermined target command and forms an extended control object together with the predetermined control object; and a model predictive control unit which has a prediction model defining a correlation between predetermined extended state variables with respect to the extended control object and the control input to the extended control object in the form of a predetermined state equation, performs model predictive control based on the prediction model on the predetermined target command according to a predetermined evaluation function in a prediction interval having a predetermined duration, and outputs a value of the control input at at least an initial time of the prediction interval. In addition, the prediction model defines a correlation between the control input and the predetermined extended state variables including a state variable related to the predetermined control object and a predetermined filter state variable related to the filter unit, and the predetermined evaluation function is configured to calculate a state quantity cost that is a stage cost with respect to state variables except the predetermined filter state variable among the predetermined extended state variables, and a control input cost that is a stage cost related to the control input.

Although the control device of the present invention is a control device for causing an output of a predetermined control object to follow a predetermined target command, the control device is configured to generate, by the model predictive control unit, a control input to an extended control object including the predetermined control object and a filter unit. Here, the filter unit performs an attenuation process at a predetermined frequency on the control input. It is desirable that the predetermined frequency be a vibration frequency related to a predetermined control object that is a direct object of vibration suppression. For example, a resonance frequency in a predetermined control object can be used as the predetermined frequency. In addition, the attenuation process may be a process of attenuating a gain of the control input with respect to the predetermined frequency to a desired degree. As an example of the filter unit, a notch filter having the predetermined frequency as a center frequency of the attenuation process may be configured or a low pass filter having the predetermined frequency as a cutoff frequency in the attenuation process may be configured.

Furthermore, a prediction model of a model predictive control unit is formed on the basis of an extended control object composed of a filter unit and a predetermined control object. Here, in the model prediction control, a prediction interval having a predetermined duration is set at each control time, an operation process according to a predetermined evaluation function is performed in the prediction interval, and a calculated control input value at at least initial time of the prediction interval is generated and output in real time. In the model prediction control, the prediction interval is shifted with an elapse of control time and so-called receding horizon control is executed. In addition, a correlation between predetermined extended state variables including both a state variable related to a predetermined control object and a state variable related to a filter unit, and a control input is reflected in a prediction model. According to this configuration, it is possible to generate a control input in which an attenuation process performed by a filter unit is reflected in real time and output the control input to an extended control object.

However, a state variable related to a filter unit is not relevant to evaluation of followability with respect to a predetermined target command, that is, evaluation of optimality according to a predetermined evaluation function in model prediction control. Accordingly, with respect to stage costs calculated according to the predetermined evaluation function, a state quantity cost with respect to state variables except the predetermined filter state variable among the predetermined extended state variables and a control input cost related to the control input are calculated and model predictive control is executed on the basis of the calculation result. According to this configuration, it is possible to generate a suitable control input in which an attenuation process performed by a filter unit is reflected in real time irrespective of change in a target command during operation of a predetermined control object and thus it is possible to cause the output of the predetermined control object to suitably follow the predetermined target command while suppressing vibration.

Here, in the above-described control device, the control input is a jerk input with respect to the predetermined control object, and the extended control object may include an integrator which performs a predetermined integration process on the jerk input in addition to the predetermined control object and the filter unit. In addition, in this case, the prediction model may define a correlation between the jerk input and the predetermined extended state variables including the state variable related to the predetermined control object, the state variable related to the filter unit, and the state variable related to the integrator, and the predetermined evaluation function may be configured to calculate the state quantity cost with respect to state variables except the predetermined filter state variable among the predetermined extended state variables and the control input cost related to the jerk input.

In the aforementioned control device, an extended control object includes a filter unit and an integrator in addition to a predetermined control object. By including the integrator in the extended control object in this manner, a control input from a model predictive control unit which is output to the extended control object can be a jerk input. As a result, with respect to stage costs calculated according to a predetermined evaluation function, a state quantity cost with respect to state variables except a predetermined filter state variable among predetermined extended state variables and a control input cost related to a jerk input that is a control input are calculated and model predictive controls executed on the basis of the calculation result. This means that the influence of a jerk input related to vibration in a predetermined control object is easily adjusted through the control input cost. Accordingly, in the aforementioned control device, it is possible to generate a suitable control input which optimizes (minimizes) a jerk input while reflecting an attenuation process performed by a filter unit therein in real time irrespective of change in a target command during operation of a predetermined control object, and thus it is possible to cause an output of a predetermined control object to suitably follow a predetermined target command while suppressing vibration.

Here, in the aforementioned control device, the predetermined evaluation function may be configured to calculate the state quantity cost as zero irrespective of the predetermined extended state variables. This means that the influence of a jerk input is evaluated to be dominant with respect to stage costs calculated according to the predetermined evaluation function. As a result, optimization (minimization) of a jerk input is promoted in model prediction control, and thus vibration in a predetermined control object can be suppressed more effectively.

Here, the above-described control device may further include a servo integrator to which a deviation between the predetermined target command and the output of the predetermined control object is input, the state variable related to the predetermined control object may include a predetermined integral term represented by a product of the deviation and a predetermined integral gain, and the prediction model may define a correlation between the predetermined extended state variables including the predetermined integral term and the control input.

Model predictive control based on a deviation is performed by employing this configuration. Accordingly, it is possible to effectively remove a steady-state deviation without unnecessarily deteriorating a follow-up transient response to a predetermined target command. In addition, since the aforementioned control device promotes removal of a steady-state deviation by including a predetermined integral term in a prediction model, it is possible to considerably reduce a load required for design of a control system and enable suitable follow-up control of a predetermined control object. When an observer or the like which estimates disturbance that is a factor of a steady-state deviation is used as in conventional technologies, it is difficult to design parameters thereof and computational load is relatively high, and thus the aforementioned configuration of the present invention is also useful in view of this.

Furthermore, the present invention can be understood as follows with respect to vibration suppression in a predetermined control object. That is, the present invention is a control device for causing an output of a predetermined control object to follow a predetermined target command and may include: an integrator which performs a predetermined integration process on a jerk input that is a control input based on the predetermined target command and forms an extended control object together with the predetermined control object; and a model predictive control unit which has a prediction model defining a correlation between predetermined extended state variables with respect to the extended control object and the jerk input to the extended control object in the form of a predetermined state equation, receives the predetermined target command, performs model predictive control based on the prediction model according to a predetermined evaluation function in a prediction interval having a predetermined duration, and outputs a value of the jerk input at at least an initial time of the prediction interval. In such a case, the prediction model may define a correlation between the jerk input and the predetermined extended state variables including a state variable related to the predetermined control object and a state variable related to the integrator, and the predetermined evaluation function may be configured to calculate a state quantity cost that is a stage cost with respect to the predetermined extended state variables and a control input cost that is a stage cost related to the jerk input.

In the aforementioned control device, an extended control object is formed by a predetermined control object and an integrator. In addition, a correlation between a jerk input and predetermined extended state variables including a state variable related to the predetermined control object and a state variable related to the integrator is reflected in a prediction model of a model predictive control unit, and with respect to stage costs calculated according to a predetermined evaluation function, a state quantity cost and a control input cost related to a jerk input that is a control input are calculated and model predictive controls executed on the basis of the calculation result. As a result, it is possible to generate a suitable control input which optimizes (minimizes) a jerk input in real time irrespective of change in a target command during operation of a predetermined control object, and thus it is possible to cause the output of the predetermined control object to suitably follow a predetermined target command while suppressing vibration.

Advantageous Effects of Invention

It is possible to provide a control system which realizes suitable servo control using model prediction control.

DESCRIPTION OF EMBODIMENTS

First Embodiment

Figure 1:
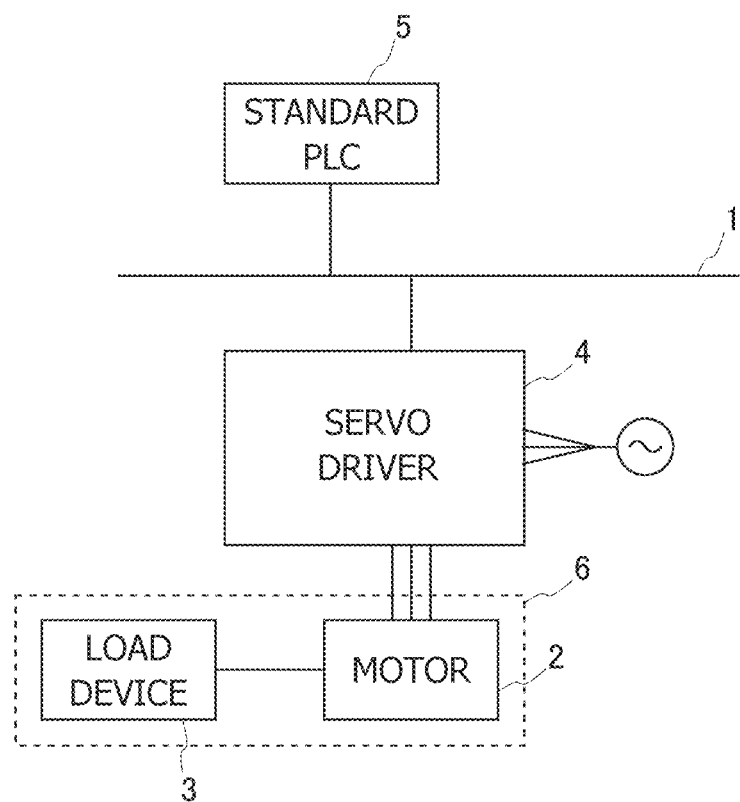
FIG. 1 is a first diagram illustrating a schematic configuration of a control system including a servo driver that is a control device.

FIG. 1 is a schematic configuration diagram of a control system according to a first embodiment. The control system includes a network 1, a servo driver 4, and a standard programmable logic controller (PLC) 5. The servo driver 4 is a control device for performing servo control of a real plant (hereinafter simply referred to as a "real plant") 6 including a motor 2 and a load device 3. In the control system, the servo driver 4 performs feedback control of the real plant 6 such that the output of the real plant 6 follows a target command transmitted from the standard PLC 5. The servo driver 4 generates a control input for performing follow-up control of the real plant 6 on the basis of the target command received from the standard PLC 5. Generation of the control input performed by the servo driver 4 will be described later. Here, various mechanisms (e.g., arms of industrial robots and conveyance devices) can be exemplified as the load device 3 constituting the real plant 6, and the motor 2 is incorporated in the load device 3 as an actuator for driving the load device 3. For example, the motor 2 may be an AC servo motor. Meanwhile, an encoder which is not illustrated is provided in the motor 2 and feedback transmission of parameter signals (a position signal, a speed signal, and the like) with respect to operation of the motor 2 to the servo driver 4 is performed by the encoder.

Figure 2:
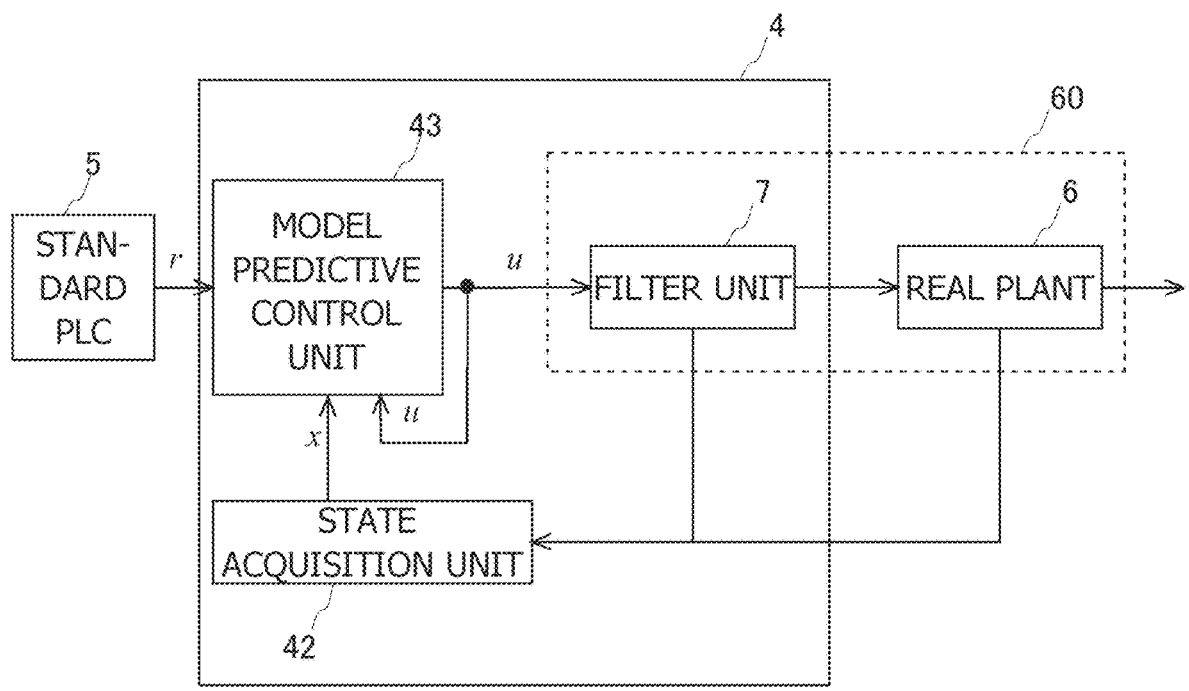
FIG. 2 is a first diagram illustrating a control structure of a servo driver of a first embodiment.

The standard PLC 5 generates a target command with respect to an operation (motion) of the real plant 6 and transmits the target command to the servo driver 4. The servo driver 4 receives the servo command from the standard PLC 5 through the network 1 and receives a feedback signal output from the encoder connected to the motor 2. Then, the servo driver 4 supplies a driving current to the motor 2 on the basis of the servo command and the feedback signal from the encoder such that the output of the real plant 6 follows a predetermined command. As this supplied current, AC power transmitted from an AC power supply to the servo driver 4 is used. Although the servo driver 4 is of a type that receives three-phase alternating current in the present embodiment, it may be a type that receives single-phase alternating current. Further, for servo control of the real plant 6 in the servo driver 4, model predictive controls executed by a model predictive control unit 43, as illustrated in FIG. 2.

Here, a control structure of the servo driver 4 will be described on the basis of FIG. 2. Meanwhile, a target command supplied from the standard PLC 5 to the servo driver 4 is denoted by r. When the output of the real plant 6 is θ, the target command r may include at least one of θ, a first differential θ', second differential θ" and a third differential θ'". The servo driver 4 includes a state acquisition unit 42, a model predictive control unit 43, and a filter unit 7. In addition, processes performed by the state acquisition unit 42, the model predictive control unit 43, and the filter unit 7 are operated and executed by an operation processing device mounted in the servo driver 4. Meanwhile, although the control structure shown in FIG. 2 relates to a case in which a control object controlled by the standard PLC 5 has one axis, when the control object has a plurality of axes, the state acquisition unit 42, the model predictive control unit 43 and the filter unit 7 may be formed in the standard PLC 5 in order for a prediction model which will be described later to cope with the plurality of control axes.

Here, the filter unit 7 performs an attenuation process at a predetermined frequency on a signal (a control input u which will be described in detail later in the present embodiment) input to the filter unit 7. It is desirable that the predetermined frequency be a vibration frequency relating to the real plant 6 that is a direct object of vibration suppression during servo control. For example, a resonance frequency in the real plant 6 can be set to the predetermined frequency. In addition, the attenuation process is a process of attenuating the gain of the signal (control input) according to the predetermined frequency to a desired degree. Accordingly, as an example, the filter unit 7 may be configured as a notch filter having the predetermined frequency as a center frequency of the attenuation process or may be configured as a low pass filter having the predetermined frequency as a cutoff frequency in the attenuation process. By forming the filter unit 7 in this manner, the signal (control input u) on which the attenuation process has been performed by the filter unit 7 is input to the real plant 6 and thus vibration suppression in the real plant 6 is expected during servo control of the real plant 6 and the output of the real plant 6 can be caused to approach to a target within a desired time.

Furthermore, in the present embodiment, an extended plant 60 including the filter unit 7 and the real plant 6 is virtually formed. Here, "extended" means that the filter unit 7 is a processor formed in the servo driver 4 as described above but is regarded as a virtual control object along with the real plant 6. In addition, the extended plant 60 is simply referred to as an "extended plant 60".

Furthermore, in the present embodiment, the state acquisition unit 42 and the model predictive control unit 43 are formed in consideration of the extended plant 60 formed as described above. The state acquisition unit 42 acquires values of state variables included in a state x related to the extended plant 60 which are provided to model predictive control executed by the model predictive control unit 43. The state variables related to the extended plant 60 are referred to as extended state variables. The extended state variables include a state variable related to the real plant 6 and a state variable (filter state variable) related to the filter unit 7. Each state variable will be described in detail later. In addition, the model predictive control unit 43 executes model predictive control (receding horizon control) using the state x with respect to the extended plant 60 acquired by the state acquisition unit 42 and the control input u to the real plant 6 which is output thereby.

Specifically, the model predictive control unit 43 has a prediction model that defines a correlation between the state x with respect to the extended plant 60 and the control input u to the extended plant 60 as the following state equation (Equation 1). Meanwhile, Equation 1 below is a nonlinear state equation. For example, predetermined physical characteristics of the real plant 6 and characteristics of the attenuation process executed by the filter unit 7 may be reflected in the prediction model. The prediction model will be described in detail later.

[Math. 1]

$$\dot{x}(t) = P(x(t), u(t)) \quad \text{(Equation 1)}$$

Here, the model predictive control unit 43 performs model predictive control on the basis of the prediction model represented by Equation 1 according to an evaluation function represented by Equation 2 below using the state x with respect to the extended plant 60 and the control input u to the extended plant 60 as inputs in a prediction interval having a predetermined duration T.

[Math. 2]

$$J = \varphi(x(t+T)) + \int_t^{t+T} L(x(\tau), u(\tau)) d\tau \quad \text{(Equation 2)}$$

The first term of the right side of Equation 2 above is a terminal cost and the second term of the right side is a stage cost. Further, the stage cost can be represented by Equation 3 below.

[Math. 3]

$$L = \tfrac{1}{2}((x\text{ref}-x)^T(k)Q(x\text{ref}-x)(k)+(u\text{ref}-u)^T(k)R(u\text{ref}-u)(k)) \quad \text{(Equation 3)}$$

Here, xref(k) represents a target state quantity at a time k, x(k) represents a calculated state quantity at the time k, uref(k) represents a target control input in a steady state at the time k, and u(k) represents a calculated control input at the time k. In addition, Q is a factor (weighting factor) representing a weight of a state quantity in the stage cost and R is a factor (weighting factor) representing a weight of a control input. Accordingly, the first term of the right side of Equation 3 represents a stage cost with respect to a state quantity and is referred to as a "state quantity cost" and the second term of the right side represents a stage cost with respect to a control input and is referred to as a "control input cost".

Based on the above, a value of the control input u at an initial time t of the prediction interval which is calculated in model predictive controls output as a control input u to the extended plant 60 corresponding to the target command r at that time t. Further, in model prediction control, the prediction interval having the predetermined duration T is set at the control time each time and the control input u to the extended plant 60 at the control time is calculated according to the evaluation function of Equation 2 and transmitted to the extended plant 60. A problem of obtaining an operation amount having the value of an evaluation function J in the form of Equation 2 as the best value is widely known as an optimal control problem and an algorithm of calculating a numerical solution thereof is disclosed as a known technology. A continuation method can be exemplified as such a technology and is disclosed in detail in a known literature "A continuation/GMRES method for fast computation of nonlinear receding horizon control", T. Ohtsuka, Automatica, Vol. 40, pp. 563-574, 2004, for example.

In the continuation method, an input U(t) in model predictive controls calculated by solving simultaneous linear equations with respect to the input U(t) represented as Equation 4 below. Specifically, Equation 4 is solved and dU/dt is numerically integrated to update the input U(t). In this manner, iteration is not performed in the continuation method and thus an operation load for calculating the input U(t) at each time can be controlled.

[Math. 4]

$$\frac{\partial F}{\partial U}\dot{U} = -\zeta F - \frac{\partial F}{\partial x}\dot{x} - \frac{\partial F}{\partial t} \quad \text{(Equation 4)}$$

Here, F and U(t) are represented by Equation 5 below.

[Math. 5]

$$F(U(t), X(t), t) = \begin{bmatrix} \frac{\partial H}{\partial u}(x_0^*(t), u_0^*(t), \lambda_1^*(t), \mu_0^*(t)) \\ C(x_0^*(t), u_0^*(t)) \\ \vdots \\ \frac{\partial H}{\partial u}(x_{N\_1}^*(t), u_{N\_1}^*(t), \lambda_N^*(t), \mu_{N\_1}^*(t)) \\ C(x_{N\_1}^*(t)u_{N\_1}^*(t)) \end{bmatrix} \quad \text{(Equation 5)}$$

$$U(t) = [u_0^{*T}(t), \mu_0^{*T}(t), \ldots, u_{N\_1}^{*T}(t), \mu_{N\_1}^{*T}(t)]$$

Here, H is a Hamiltonian, $\lambda$ is a costate, and p is a Lagrange multiplier having a constraint condition of C=0.

Figure 3:
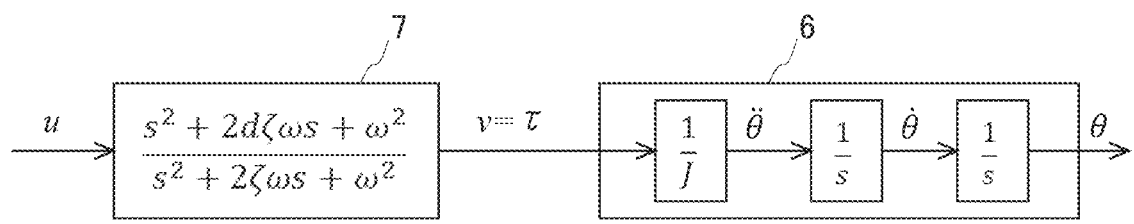
FIG. 3 is a diagram illustrating transfer functions of a filter unit and a real plant in the servo driver of the first embodiment.

Here, the prediction model of the model predictive control unit 43 is determined on the basis of the fact that the extended plant 60 includes the filter unit 7 and the real plant 6 as described above. FIG. 3 illustrates a transfer function in the filter unit 7 and a transfer function in the real plant 6. An output when the control input u is input to the filter unit 7 is represented as V, and the output V is an input to the real plant 6. Meanwhile, the input V to the real plant 6 in the present embodiment is a torque input T.

In addition, when a filter state variable related to the filter unit 7 is represented by Equation 6 below, a state equation and an output equation of the filter unit 7 can be represented by Equation 7 below. Meanwhile, refer to FIG. 4 described later for the filter state variable. Further, the output V from the filter unit 7 is calculated on the basis of the control input u according to Equation 8 below.

[Math. 6]

$$x_{nf} = \begin{bmatrix} \gamma \\ \dot{\gamma} \end{bmatrix} \quad \text{(Equation 6)}$$

[Math. 7]

$$\dot{x}_{nf} = A_{nf}x_{nf} + B_{nf}u \quad \text{(Equation 7)}$$
$$v = C_{nf}x_{nf} + D_{nf}u$$

[Math. 8]

$$v(t) = \int_o^t n_f(t-\tau)u(\tau)d\tau \quad \text{(Equation 8)}$$

In addition, when the filter unit 7 is assumed to be a second-order notch filter, the transfer function thereof is represented by Equation 9 below.

[Math. 9]

$$\frac{v}{u} = \frac{(s^2 + 2d\zeta\omega s + \omega^2)}{(s^2 + 2\zeta\omega s + \omega^2)} = 1 - \frac{2\zeta(1-d)\omega s}{(s^2 + 2\zeta\omega s + \omega^2)} \quad \text{(Equation 9)}$$

Here, d denotes a parameter with respect to the depth of a notch, $\zeta$ denotes a parameter with respect to the width of the notch, and $\omega$ denotes a center frequency of the notch.

Based on the above, the state equation and the output equation of the filter unit 7 represented by Equation 7 can be represented as Equation 10 below.

[Math. 10]

$$\begin{bmatrix} \dot{\gamma} \\ \ddot{\gamma} \end{bmatrix} = \begin{bmatrix} 0 & 1 \\ -\omega^2 & -2\zeta\omega \end{bmatrix}\begin{bmatrix} \gamma \\ \dot{\gamma} \end{bmatrix} + \begin{bmatrix} 0 \\ 1 \end{bmatrix}u \quad \text{(Equation 10)}$$

$$v = -[0 \ 2\zeta(1-d)\omega]\begin{bmatrix} \gamma \\ \dot{\gamma} \end{bmatrix} + u$$

Next, when the state variable related to the real plant 6 is represented by Equation 11 below, a state equation of the real plant 6 can be represented by Equation 12 below. Here, $\theta$ denotes the output of the real plant 6 and J denotes the inertia of the real plant 6.

[Math. 11]

$$x_p = \begin{bmatrix} \theta \\ \dot{\theta} \end{bmatrix} \quad \text{(Equation 11)}$$

[Math. 12]

$$\begin{bmatrix} \dot{\theta} \\ \ddot{\theta} \end{bmatrix} = \begin{bmatrix} 0 & 1 \\ 0 & 0 \end{bmatrix}\begin{bmatrix} \theta \\ \dot{\theta} \end{bmatrix} + \begin{bmatrix} 0 \\ \frac{1}{J} \end{bmatrix}v \quad \text{(Equation 12)}$$

Figure 4:
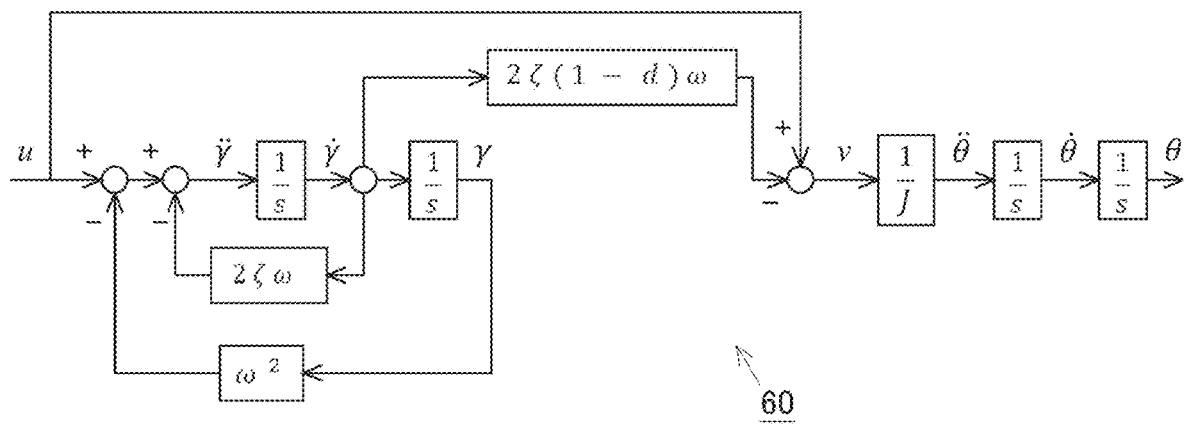
FIG. 4 is a diagram illustrating a control structure with respect to an extended plant formed by the filter unit and the real plant in the servo driver of the first embodiment.

Based on Equation 10 and Equation 12 above, a control structure of the extended plant 60 including the filter unit 7 and the real plant 6 can be represented as illustrated in FIG. 4. The state variables related to the extended plant 60, that is, the extended state variables, can be represented by Equation 13 below and thus the prediction model P of the model predictive control unit 43 can be represented by Equation 14 below.

[Math. 13]

$$x = \begin{bmatrix} x_p \\ x_{nf} \end{bmatrix} = \begin{bmatrix} \theta \\ \dot{\theta} \\ \gamma \\ \dot{\gamma} \end{bmatrix} \quad \text{(Equation 13)}$$

[Math. 14]

$$P = \begin{bmatrix} \dot{\theta} \\ \ddot{\theta} \\ \dot{\gamma} \\ \ddot{\gamma} \end{bmatrix} = \begin{bmatrix} \dot{\theta} \\ (u - 2\zeta(1-d)\omega\dot{\gamma})/J \\ \dot{\gamma} \\ -\omega^2\gamma - 2\zeta\omega\dot{\gamma} + u \end{bmatrix} \quad \text{(Equation 14)}$$

As represented by Equation 14, the prediction model P of the model predictive control unit 43 defines a correlation between the extended state variables and the control input u. As a result, the model predictive control unit 43 can generate the control input u in which the attenuation process performed by the filter unit 7 is reflected in real time and outputs the control input u to the extended plant 60.

However, it cannot be said that the filter state variable is relevant to evaluation of followability with respect to the target command r, that is, evaluation of suitability according to the evaluation function represented by Equation 2 in the model prediction control. Accordingly, with respect to the stage costs represented by Equation 3 which are calculated according to the aforementioned evaluation function, a state quantity cost with respect to state variables except the filter state variable among the extended state variables and a control input cost related to the control input are calculated and model predictive controls executed on the basis of the calculation result. Specifically, the weighting factors Q and R are set as described below.

Q=diag (C1, C2, 0, 0)
R=diag (C3)

Here, diag represents a diagonal matrix and C1 to C3 are arbitrary positive numbers.

By setting the weighting factors related to the filter state variable to 0 with respect to calculation of the state quantity cost in this manner, it is possible to exclude involvement of the filter state variable in calculation of the stage costs in model prediction control. As a result, it is possible to generate the suitable control input u in which the attenuation process of the filter unit 7 is reflected in real time irrespective of change in the target command r during operation of the real plant 6, provide the control input u to the extended plant 60, and as a result, cause the output of the real plant 6 to suitably follow the target command r while suppressing vibration.

<Simulation Results>

Figure 5A:
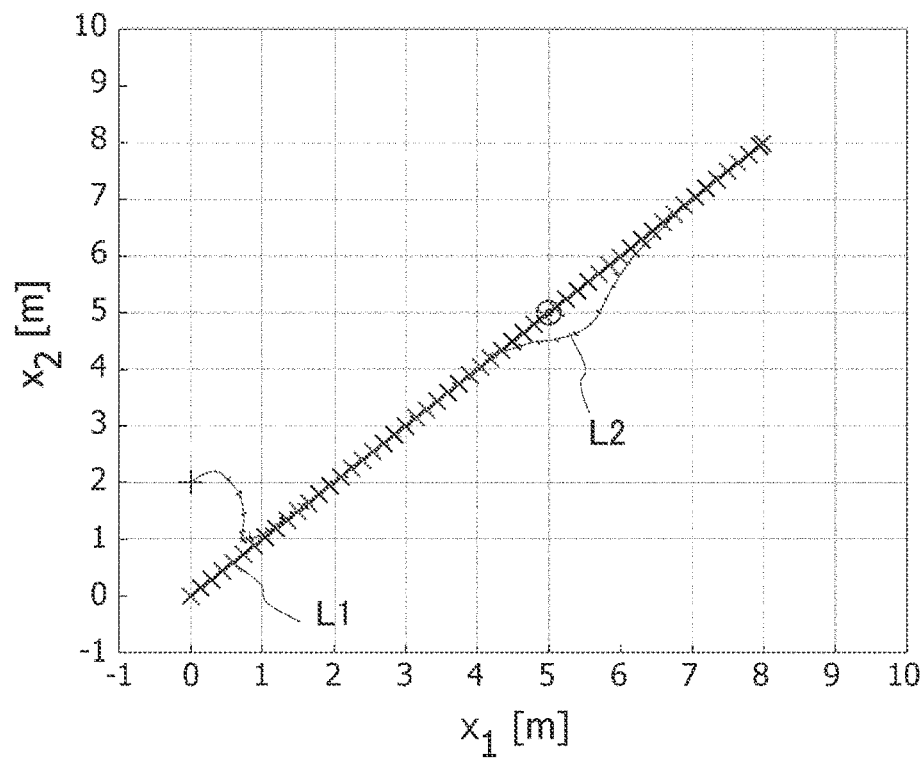
FIGS. 5A and 5B are diagrams illustrating results of followability when servo control of a real plant having two control axes is performed using the servo driver of the first embodiment.
Figure 5B:
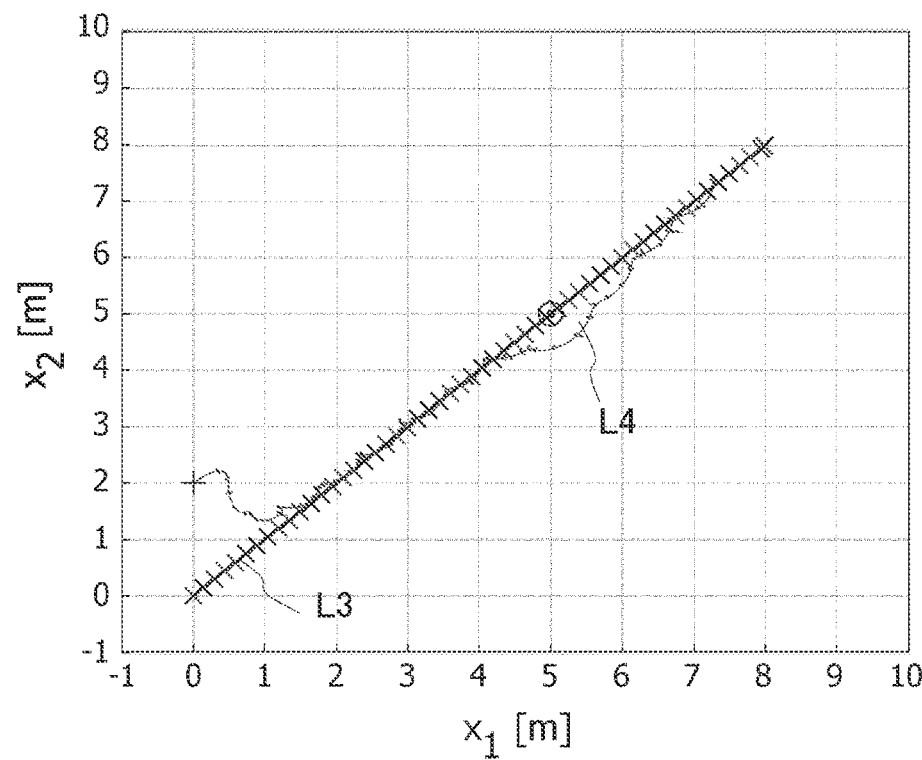

Although the above-described embodiment copes with a form in which the real plant 6 includes one control axis, simulation results when other control axes are added and the servo driver 4 is configured to have the real plant 6 including the plurality of control axes as a servo control object are shown in FIGS. 5A and 5B. In such a case, extended state variables can be represented by Equation 15 below and the prediction model P2 of the model predictive control unit 43 can be represented by Equation 16 below. Meanwhile, this case corresponds to a case in which the real plant 6 includes two control axes.

[Math. 15]

$$x = \begin{bmatrix} \theta_1 \\ \theta_2 \\ \dot{\theta}_1 \\ \dot{\theta}_1 \\ \gamma_1 \\ \gamma_2 \\ \dot{\gamma}_1 \\ \dot{\gamma}_2 \end{bmatrix} \quad \text{(Equation 15)}$$

Here, subscripts "1" and "2" in Equation 15 represent the numbers of control axes controlled by the servo driver 4. Meanwhile, the subscripts are applied in the same manner in Equation 16 below.

[Math. 16]

$$P2 = \begin{bmatrix} \dot{\theta}_1 \\ \dot{\theta}_2 \\ (u_1 - 2\zeta_1\omega_1(1-d_1)\dot{\gamma}_1)/J_1 \\ (u_2 - 2\zeta_2\omega_2(1-d_2)\dot{\gamma}_2)/J_2 \\ \dot{\gamma}_1 \\ \dot{\gamma}_2 \\ -\omega_1^2\gamma_1 - 2\zeta_1\omega_1\dot{\gamma}_1 + u_1 \\ -\omega_2^2\gamma_2 - 2\zeta_2\omega_2\dot{\gamma}_2 + u_2 \end{bmatrix} \quad \text{(Equation 16)}$$

In addition, the weighting factors Q and R in the above case are sets as follows.

Q=diag (20, 20, 5, 5, 0, 0, 0, 0)
R=diag (1, 1)

Furthermore, in FIGS. 5A and 5B, a simulation result when the model predictive control unit 43 has employed the prediction model represented by Equation 16 and the weighting factors Q and R is shown in FIG. 5A and a simulation result when the servo driver 4 does not include the filter unit 7 and has performed model predictive control through the model predictive control unit 43 having the predictive model corresponding only to the real plant 6 is shown in FIG. 5B. In the simulations, predetermined disturbance vibration (vibration having the aforementioned predetermined frequency ω as a main component) is applied to the control input. In addition, in FIGS. 5A and 5B, target command trajectories are represented by lines L1 and L3 and trajectories of outputs of the real plant 6 which are results of servo control of the servo driver 4 are represented by lines L2 and L4 in a task coordinate system in which the output of a first control axis is set to the horizontal axis and the output of a second control axis is set to the vertical axis. As can be ascertained from comparison between FIG. 5A and FIG. 5B, suitable following of the target command is realized while effectively suppressing vibration in the output of the real plant 6 by employing the prediction model represented by Equation 16 and the weighting factors Q and R for the model predictive control unit 43.

Second Embodiment

Figure 6:
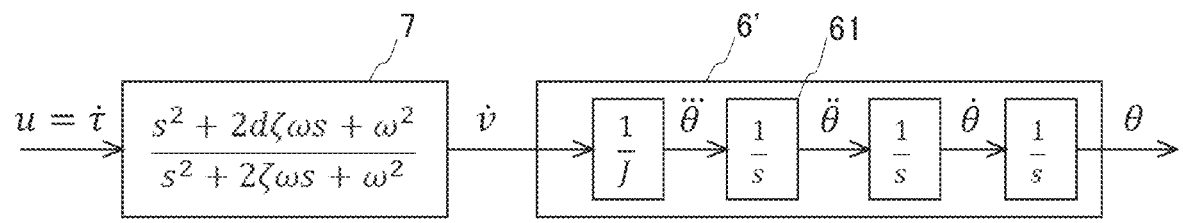
FIG. 6 is a first diagram illustrating transfer functions of a filter unit and a real plant in a servo driver of a second embodiment.
Figure 7:
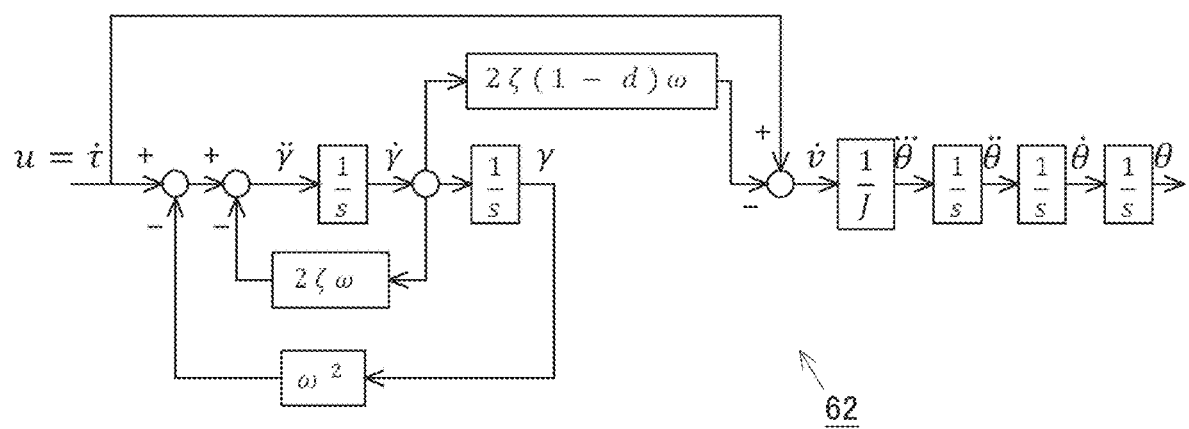
FIG. 7 is a first diagram illustrating a control structure with respect to an extended plant formed by the filter unit and the real plant in the servo driver of the second embodiment.

Servo control of the servo driver 4 according to a second embodiment will be described on the basis of FIG. 6 and FIG. 7. In the present embodiment, a virtual real plant 6' is newly defined by adding an integrator 61 to the real plant 6 of the above-described first embodiment and an extended plant 62 is formed by the real plant 6' and the aforementioned filter unit 7. In addition, FIG. 6 illustrates transfer functions of the filter unit 7 and the real plant 6' and FIG. 7 illustrates a control structure of the extended plant 62 including the filter unit 7 and the real plant 6'.

In the extended plant 62 of the present embodiment, a control input u is considered to be a jerk input (dτ/dt). The jerk input (dτ/dt) input to the filter unit 7 is output as dv/dt and continuously input to the real plant 6'. The real plant 6' includes the aforementioned integrator 61. In addition, extended state variables related to the extended plant 62 are represented by Equation 17 below, and when the state equation and the output equation of the filter unit 7 represented by Equation 10 above are taken into account, a prediction model P3 of the model predictive control unit 43 can be represented by Equation 18 below.

[Math. 17]

$$x = \begin{bmatrix} \theta \\ \dot{\theta} \\ \ddot{\theta} \\ \gamma \\ \dot{\gamma} \end{bmatrix} \quad \text{(Equation 17)}$$

[Math. 18]

$$P3 = \begin{bmatrix} \dot{\theta} \\ \ddot{\theta} \\ \dddot{\theta} \\ \dot{\gamma} \\ \ddot{\gamma} \end{bmatrix} = \begin{bmatrix} \dot{\theta} \\ \ddot{\theta} \\ \dfrac{-2\zeta(1-d)\omega\dot{\gamma}+u}{J} \\ \dot{\gamma} \\ -\omega^2\gamma - 2\zeta\omega\dot{\gamma}+u \end{bmatrix} \quad \text{(Equation 18)}$$

In the prediction model P3 of Equation 18 above, a correlation between the extended state variables and the jerk input u that is the control input is defined. As a result, the model predictive control unit 43 can generate the jerk input u that is the control input in which the attenuation process of the filter unit 7 is reflected in real time and output the jerk input u to the extended plant 62.

Furthermore, in a process of calculating stage costs in an evaluation function in model prediction control, since the influence of the filter state variable is excluded as in the above-described first embodiment, a state quantity cost with respect to state variables except the filter state variable among extended state variables and a control input cost related to the jerk input u are calculated and model predictive controls executed on the basis of the calculation result. Specifically, the weighting factors Q and R are set as follows, and particularly, a weighting factor related to the filter state variable is set to 0 in the weighting factor Q.

Q=diag (C11, C12, C13, 0, 0)
R=diag (C14)
Here, C11 to C14 are arbitrary positive numbers.

In this manner, the state quantity cost with respect to state variables except the filter state variable among the extended state variables and the control input cost related to the jerk input that is the control input are calculated in a process of calculating stage costs in model predictive control in the present embodiment. According to this configuration, the influence of the jerk input involved in vibration of the real plant 6', substantially, the real plant 6, is easily optimized (minimized) through the control input cost and thus it is possible to cause the output of the real plant 6 to suitably follow the target command r while effectively suppressing vibration.

As another method, Q=diag (0, 0, 0, 0, 0) may be set with respect to the weighting factor Q when optimization (minimization) of the influence of the jerk input is focused. In this case, since the control input cost itself becomes a stage cost, optimization (minimization) focusing on the jerk input is performed.

<Simulation Results>

Figure 8:
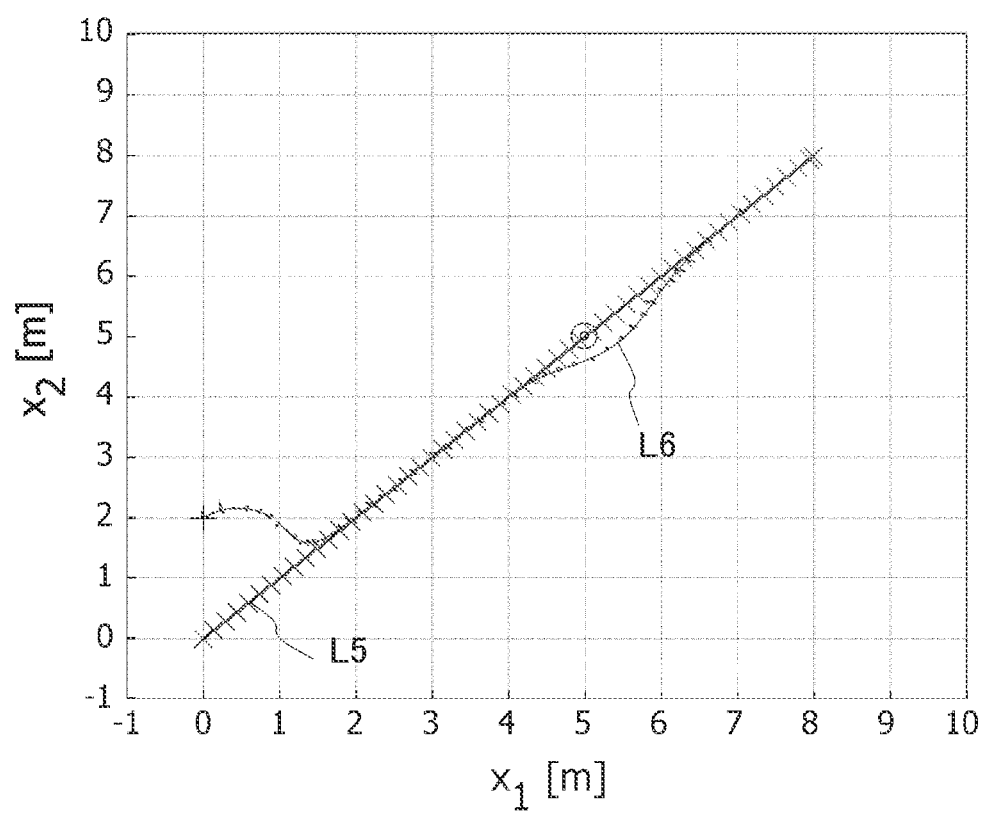
FIG. 8 is a diagram illustrating results of followability when servo control of a real plant having two control axes is performed using the servo driver of the second embodiment.

Simulation results when the control structure of the servo driver 4 configured to have the real plant 6 including two control axes as a servo control object, as described in the first embodiment, is configured as shown in FIG. 6 and FIG. 7 are shown in FIG. 8. Simulation conditions are the same as those in the case of the simulation results shown in FIGS. 5A and 5B. In FIG. 8, a target command trajectory is represented by a line L5 and a trajectory of the output of the real plant 6 which is a result of servo control of the servo driver 4 is represented by a line L6 in a task coordinate system in which the output of a first control axis is set to the horizontal axis and the output of a second control axis is set to the vertical axis. As can be ascertained from FIG. 8, suitable following of the target command is realized while effectively suppressing vibration in the output of the real plant 6 by employing the prediction model represented by Equation 18 and the weighting factors Q and R for the model predictive control unit 43.

MODIFIED EXAMPLE

Figure 9:
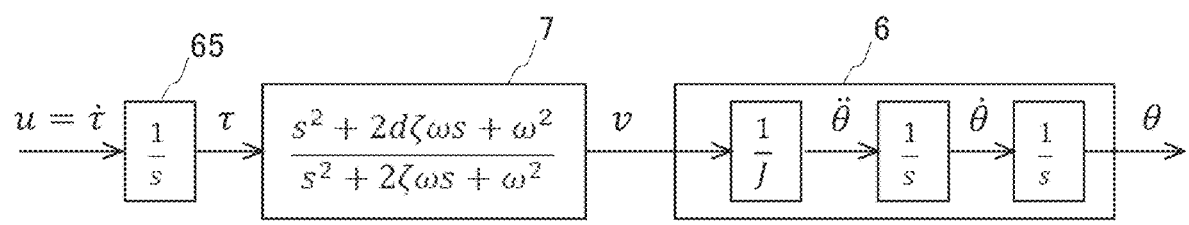
FIG. 9 is a second diagram illustrating transfer functions of a filter unit and a real plant in the servo driver of the second embodiment.
Figure 10:
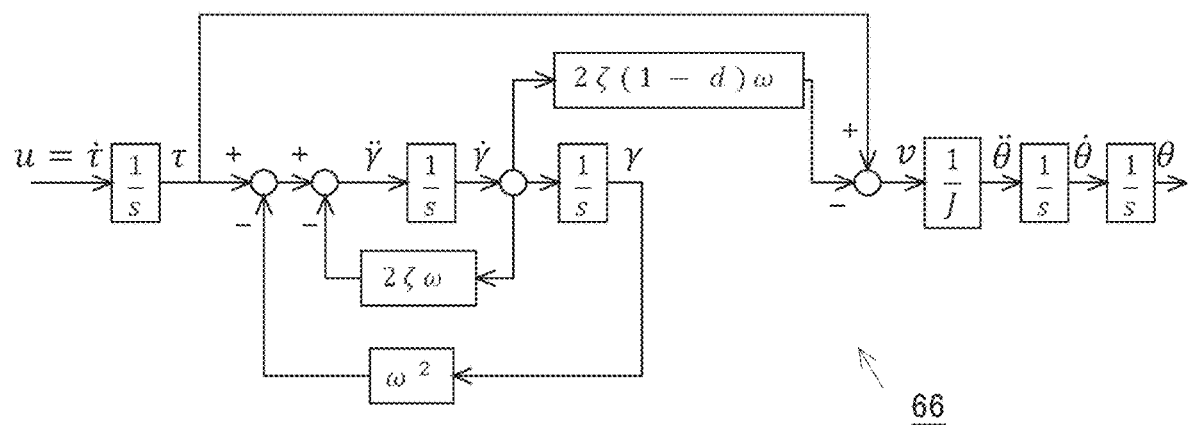
FIG. 10 is a second diagram illustrating a control structure with respect to an extended plant formed by the filter unit and the real plant in the servo driver of the second embodiment.

A modified example of the present embodiment will be described on the basis of FIG. 9 and FIG. 10. In the present modified example, the real plant 6 of the above-described first embodiment is provided as it is, an integrator 65 is added to the front stage of the filter unit 7, and the integrator 65, the filter unit 7, and the real plant 6 constitute an extended plant 66. In addition, FIG. 9 illustrates transfer functions of the integrator 65, the filter unit 7, and the real plant 6 and FIG. 10 illustrates a control structure of the extended plant 66 including the integrator 65, the filter unit 7, and the real plant 6.

In the extended plant 66 of the present modified example, the control input u is also considered to be a jerk input (dτ/dt). The jerk input (dτ/dt) is input to the integrator 65 and a torque output τ is generated and continuously input to the filter unit 7. As a result, an output v is generated through the filter unit 7 and continuously input to the real plant 6. Here, in the present embodiment, when the integrator 65 and the filter unit 7 are regarded as a virtual filter unit, a state variable $x_{nf0}$ of the virtual filter unit is defined as represented by Equation 19 below. Then, a state equation and an output equation of the virtual filter unit are represented by Equation 20 below.

[Math. 19]

$$x_{nf0} = \begin{bmatrix} \gamma \\ \dot{\gamma} \\ \tau \end{bmatrix} \quad \text{(Equation 19)}$$

[Math. 20]

$$\begin{bmatrix} \dot{\gamma} \\ \ddot{\gamma} \\ \dot{\tau} \end{bmatrix} = \begin{bmatrix} 0 & 1 & 0 \\ -\omega^2 & -2\zeta\omega & 1 \\ 0 & 0 & 0 \end{bmatrix} \begin{bmatrix} \gamma \\ \dot{\gamma} \\ \tau \end{bmatrix} + \begin{bmatrix} 0 \\ 0 \\ 1 \end{bmatrix} u \quad \text{(Equation 20)}$$

$$v = \begin{bmatrix} 0 & -2\zeta(1-d)\omega & 1 \end{bmatrix} \begin{bmatrix} \gamma \\ \dot{\gamma} \\ \tau \end{bmatrix}$$

Based on the above, extended state variables related to the extended plant 66 can be represented by Equation 21 below and a prediction model P4 of the model predictive control unit 43 can be represented by Equation 22 below.

[Math. 21]

$$x = \begin{bmatrix} \theta \\ \dot{\theta} \\ \gamma \\ \dot{\gamma} \\ \tau \end{bmatrix} \quad \text{(Equation 21)}$$

[Math. 22]

$$P4 = \begin{bmatrix} \dot{\theta} \\ \ddot{\theta} \\ \dot{\gamma} \\ \ddot{\gamma} \\ \dot{\tau} \end{bmatrix} = \begin{bmatrix} \dot{\theta} \\ \dfrac{\tau - 2\zeta(1-d)\omega\dot{\gamma}}{J} \\ \dot{\gamma} \\ -\omega^2\gamma - 2\zeta\omega\dot{\gamma} + u \\ u \end{bmatrix} \quad \text{(Equation 22)}$$

In the prediction model P4 of Equation 22 above, a correlation between the extended state variables and the jerk input u that is the control input is also defined. As a result, the model predictive control unit 43 can generate the jerk input u that is the control input in which the attenuation process performed by the filter unit 7 is reflected in real time and output the jerk input u to the extended plant 66. Further, in the process of calculating stage costs in an evaluation function in model predictive control, since the influence of the filter state variable is excluded, a state quantity cost with respect to state variables except the filter state variable among the extended state variables and a control input cost related to the jerk input u are calculated and model predictive control is executed on the basis of the calculation result. Specifically, the weighting factors Q and R are set as follows, and particularly, a weighting factor related to the filter state variable is set to 0 in the weighting factor Q.

Q=diag (C21, C22, 0, 0, C23)
R=diag (C24)

Here, C21 to C24 are arbitrary positive numbers.

In this configuration, the influence of the jerk input involved in vibration of the real plant 6 is also easily optimized (minimized) through the control input cost and thus it is possible to cause the output of the real plant 6 to suitably follow the target command r while effectively suppressing vibration.

Third Embodiment

Servo control of the servo driver 4 according to a third embodiment will be described on the basis of FIG. 11. In the servo driver 4 of the present embodiment, while an extended plant 60 is formed by the real plant 6 and the filter unit 7 and model predictive control is performed by the model predictive control unit 43 as in the above-described first embodiment, an output z of a servo integrator 41 is acquired by the state acquisition unit 42 and provided to the model predictive control in that case.

Specifically, a deviation e (e=r−θ) between the target command r transmitted from the standard PLC 5 and the output θ of the real plant 6 which is fed back through a feedback system 45 is input to the servo integrator 41. In addition, the output z of the servo integrator 41 is input to the model predictive control unit 43 through the state acquisition unit 42. Accordingly, the output z is added to the aforementioned extended state variables with respect to the extended plant 60 by the state acquisition unit 42 and provided to model predictive control executed by the model predictive control unit 43.

When the extended state variables are represented by Equation 23 below on the basis of the control structure including the servo integrator 41 as described above, a prediction model P5 of the model predictive control unit 43 can be represented by Equation 24 below, for example, with reference to Equation 14 above.

[Math. 23]

$$x = \begin{bmatrix} \theta \\ \dot{\theta} \\ \gamma \\ \dot{\gamma} \\ z \end{bmatrix} \quad \text{(Equation 23)}$$

[Math. 24]

$$P5 = \begin{bmatrix} \dot{\theta} \\ \ddot{\theta} \\ \dot{\gamma} \\ \ddot{\gamma} \\ \dot{z} \end{bmatrix} = \begin{bmatrix} \dot{\theta} \\ (u - 2\zeta(1-d)\omega\dot{\gamma})/J \\ \dot{\gamma} \\ -\omega^2\gamma - 2\zeta\omega\dot{\gamma} + u \\ (r - \theta)K_i \end{bmatrix} \quad \text{(Equation 24)}$$

In Equation 24, (r−θ) represents the deviation e. Further, it can be understood that the prediction model includes an integral term represented by a product of the deviation e (r−θ) and a predetermined integral gain $K_i$. Accordingly, in servo control of the servo driver 4 using model prediction control, the quantity of integration that is a driving source of servo control is easily adjusted in addition to the vibration suppression effect described in the first embodiment, and servo control with reduced overshoot is easily realized without using a conventional disturbance observer that requires difficult adjustment such as extension of a disturbance model and design of an observer gain.

Figure 12:
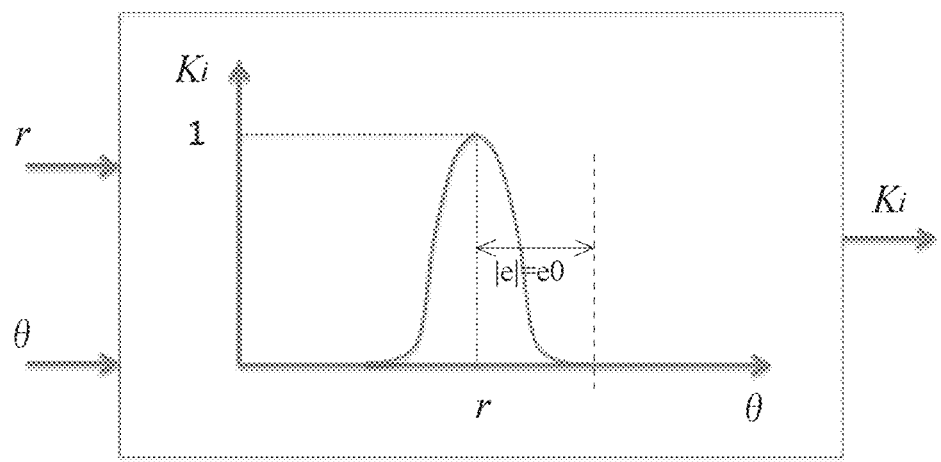
FIG. 12 is a diagram for explaining setting of an integral gain based on a deviation between a target command and an output.

In addition, the predetermined integral gain $K_i$ of the integral term included in the prediction model represented in Equation 24 can be adjusted on the basis of the deviation e, as illustrated in FIG. 12. Specifically, the predetermined integral gain $K_i$ is adjusted such that the value of the predetermined integral gain $K_i$ increases as the magnitude of the deviation e decreases. Particularly, in FIG. 12, the predetermined integral gain $K_i$ is 0 when the magnitude of the deviation e is equal to or greater than e0 and is set to a value greater than 0 and equal to or less than 1 when the magnitude of the deviation e is in a range less than e0. In addition, the tendency of the predetermined integral gain $K_i$ is set such that the value of the predetermined integral gain $K_i$ abruptly approaches 1 as the magnitude of the deviation e approaches 0 and the predetermined integral gain $K_i$ becomes 1 when the magnitude of the deviation e is 0. In this manner, the predetermined integral gain $K_i$ can be adjusted on the basis of the magnitude of the deviation e, and thus the value of the predetermined integral gain $K_i$ is adjusted to be reduced when the output θ of the real plant 6 is relatively separated from the target command r such that the quantity of integration for servo control is adjusted not to be unnecessary accumulated. Furthermore, since the value of the predetermined integral gain $K_i$ is adjusted to increase when the amount of separation between the output θ of the real plant 6 and the target command r decreases, that is, the magnitude of the deviation e decreases, followability in servo control can be effectively improved. By varying the value of the predetermined integral gain $K_i$ in this manner, it is possible to promote suitable followability of servo control while suppressing both vibration and overshoot.

Meanwhile, with respect to adjustment of the predetermined integral gain $K_i$, data with respect to a correlation between the deviation e and the predetermined integral gain $K_i$ shown in FIG. 12 may be stored in a memory of the servo driver 4, and in this case, the model predictive control unit 43 performs the above-described adjustment of the predetermined integral gain $K_i$ by accessing the data.

<Simulation Results>

Figure 11:
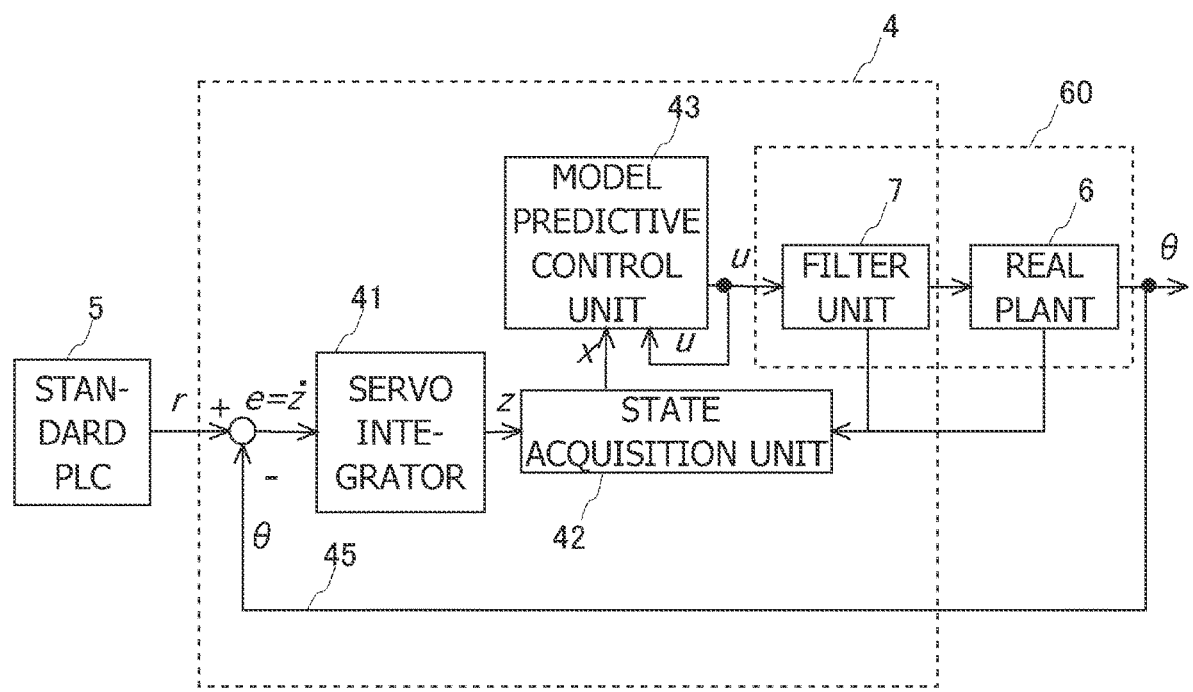
FIG. 11 is a diagram illustrating a control structure of a servo driver of a third embodiment.
Figure 13:
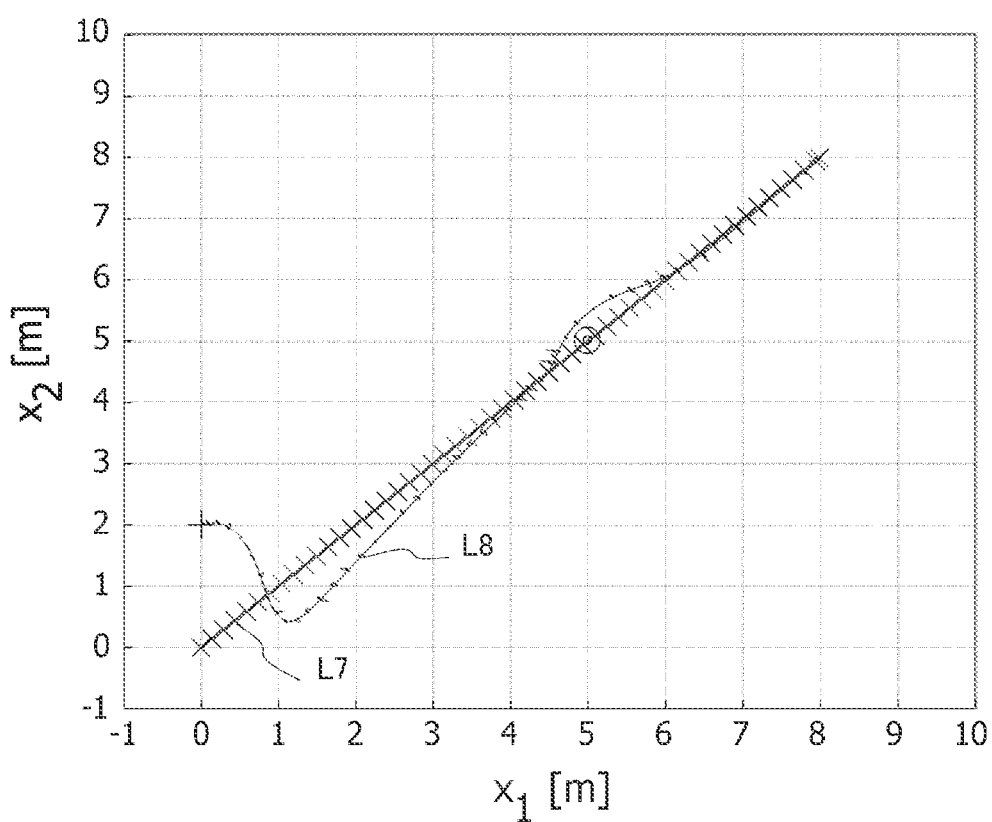
FIG. 13 is a diagram illustrating results of followability when servo control of a real plant having two control axes is performed using the servo driver of the third embodiment.

Simulation results when the control structure of the servo driver 4 configured to have the real plant 6 including two control axes as a servo control object, as described in the first embodiment, is configured as shown in FIG. 11 are shown in FIG. 13. Simulation conditions are the same as those in the case of the simulation results shown in FIGS. 5A and 5B. In FIG. 13, a target command trajectory is represented by a line L7 and a trajectory of the output of the real plant 6 which is a result of servo control of the servo driver 4 is represented by a line L8 in a task coordinate system in which the output of a first control axis is set to the horizontal axis and the output of a second control axis is set to the vertical axis. As can be ascertained from FIG. 13, suitable following of the target command r is realized while suppressing both vibration in the output of the real plant 6 and the quantity of overshoot by employing the prediction model represented by Equation 24 for the model predictive control unit 43.

Fourth Embodiment

Figure 14:
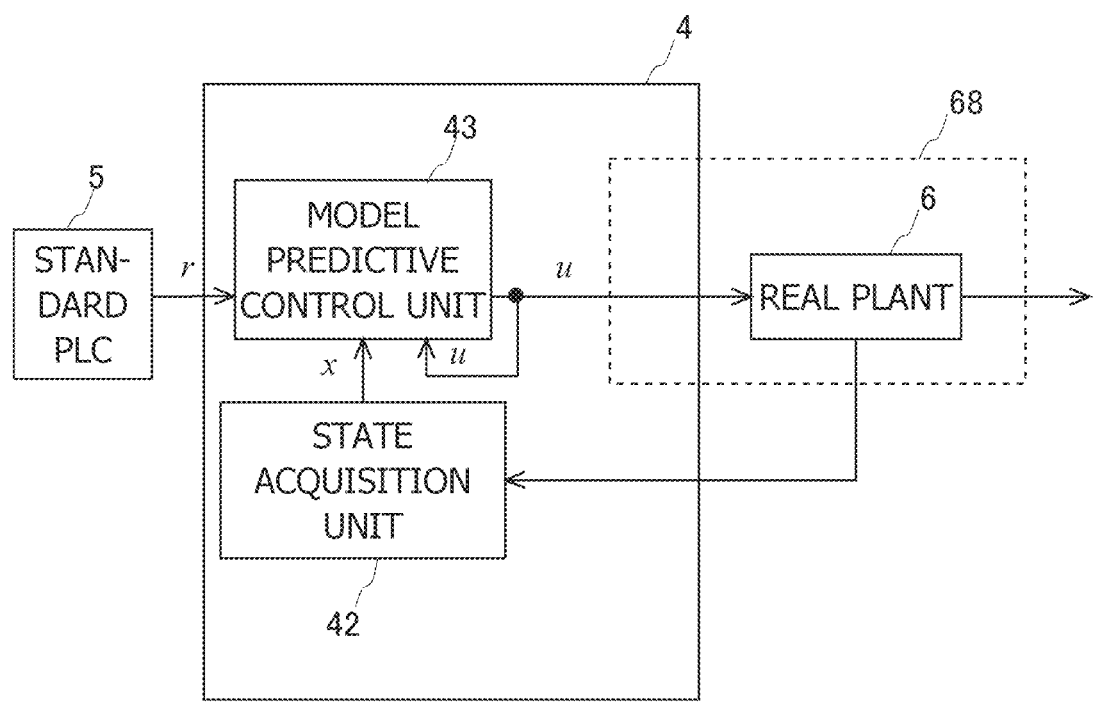
FIG. 14 is a first diagram illustrating a control structure of a servo driver of a fourth embodiment.

Servo control of the servo driver 4 according to a fourth embodiment will be described on the basis of FIG. 14 and FIGS. 15A and 15B. In the present embodiment, the servo driver 4 does not include the filter unit 7 as illustrated in FIG. 14. Accordingly, the state acquisition unit 42 is configured to acquire extended state variables related to an extended plant 68 formed including the real plant 6.

Figure 15A:
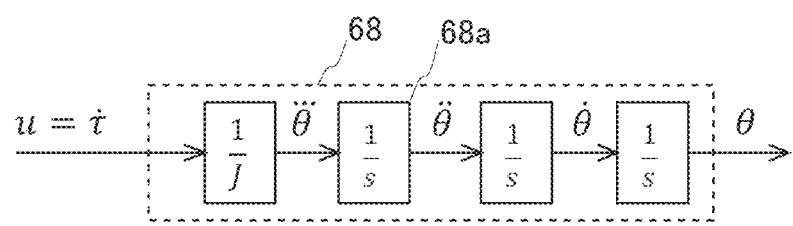
FIGS. 15A and 15B are diagrams illustrating a control structure with respect to an extended plant in the servo driver of the fourth embodiment.
Figure 15B:
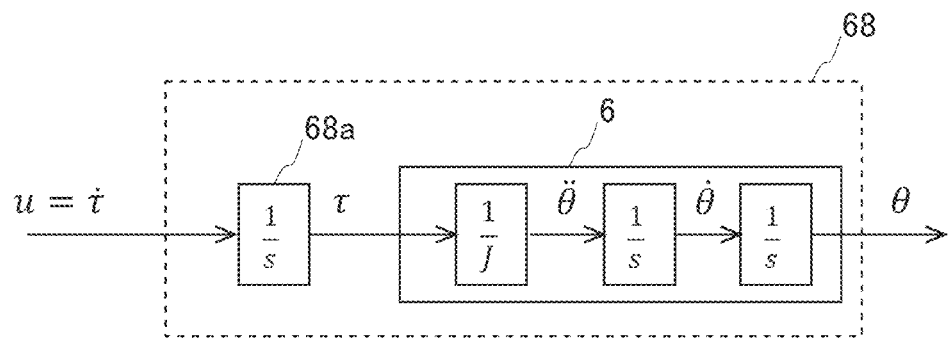

Two forms of the extended plant 68 formed in the present embodiment are illustrated in FIGS. 15A and 15B. First, the extended plant 68 in the first form illustrated in FIG. 15A will be described. The extended plant 68 in the first form is formed on the assumption that an integrator 68a is included in the real plant 6 to realize a virtual real plant. In this extended plant 68, the control input u is considered to be a jerk input (dτ/dt). In addition, when the extended state variables related to the extended plant 68 are represented by Equation 25 below, a prediction model P6 of the model predictive control unit 43 can be represented by Equation 26 below.

[Math. 25]

$$x = \begin{bmatrix} \theta \\ \dot{\theta} \\ \ddot{\theta} \end{bmatrix} \quad \text{(Equation 25)}$$

[Math. 26]

$$P6 = \begin{bmatrix} \dot{\theta} \\ \ddot{\theta} \\ \dddot{\theta} \end{bmatrix} = \begin{bmatrix} \dot{\theta} \\ \ddot{\theta} \\ \dfrac{u}{J} \end{bmatrix} \quad \text{(Equation 26)}$$

In the prediction model P6 of Equation 26 above, a correlation between the extended state variables and the jerk input u that is the control input is defined. As a result, the model predictive control unit 43 can generate the jerk input u for servo control in real time and output the jerk input u to the extended plant 68.

Further, in a process of calculating stage costs in an evaluation function in model prediction control, a state quantity cost with respect to the extended state variables and a control input cost related to the jerk input u are calculated and model predictive controls executed on the basis of the calculation result. Specifically, the weighting factors Q and R are set as follows.

Q=diag (C31, C32, C33)

R=diag (C34)

Here, C31 to C34 are arbitrary positive numbers.

In the present embodiment as described above, the state quantity cost with respect to the extended state variables and the control input cost related to the jerk input that is the control input are calculated in the process of calculating stage costs in model prediction control. In such a configuration, the influence of the jerk input involved in vibration of the real plant 6 is easily optimized (minimized) through the control input cost and thus it is possible to cause the output of the real plant 6 to suitably follow the target command r while effectively suppressing vibration.

As another method, Q=diag (0, 0, 0) may be set with respect to the weighting factor Q when optimization (minimization) of the influence of the jerk input is focused. In this case, since the control input cost itself becomes a stage cost, optimization (minimization) focusing on the jerk input is performed.

Next, the extended plant 68 in the second form illustrated in FIG. 15B will be described. The extended plant 68 in the second form is formed by the integrator 68a disposed in front stage of the real plant 6 and the real plant 6. In this extended plant 68, the control input u is also considered to be a jerk input (dτ/dt). In addition, when the extended state variables related to the extended plant 68 are represented by Equation 27 below, a prediction model P6' of the model predictive control unit 43 can be represented by Equation 28 below.

[Math. 27]

$$x = \begin{bmatrix} \theta \\ \dot{\theta} \\ \tau \end{bmatrix} \quad \text{(Equation 27)}$$

[Math. 28]

$$P6' = \begin{bmatrix} \dot{\theta} \\ \ddot{\theta} \\ \dot{\tau} \end{bmatrix} = \begin{bmatrix} \dot{\theta} \\ \dfrac{\tau}{J} \\ u \end{bmatrix} \quad \text{(Equation 28)}$$

In the prediction model P6' of Equation 28 above, a correlation between the extended state variables and the jerk input u that is the control input is also defined. As a result, the model predictive control unit 43 can generate the jerk input u for servo control in real time and output the jerk input u to the extended plant 68. Further, in a process of calculating stage costs in an evaluation function in model prediction control, a state quantity cost with respect to the extended state variables and a control input cost related to the jerk input u are calculated and model predictive controls executed on the basis of the calculation result. Specifically, the weighting factors Q and R are set as follows.

Q=diag (C41, C42, C43)
R=diag (C44)

Here, C41 to C44 are arbitrary positive numbers.

In such a configuration, the influence of the jerk input involved in vibration of the real plant 6 is also easily optimized (minimized) through the control input cost and thus it is possible to cause the output of the real plant 6 to suitably follow the target command r while effectively suppressing vibration.

<Simulation Results>

Figure 16:
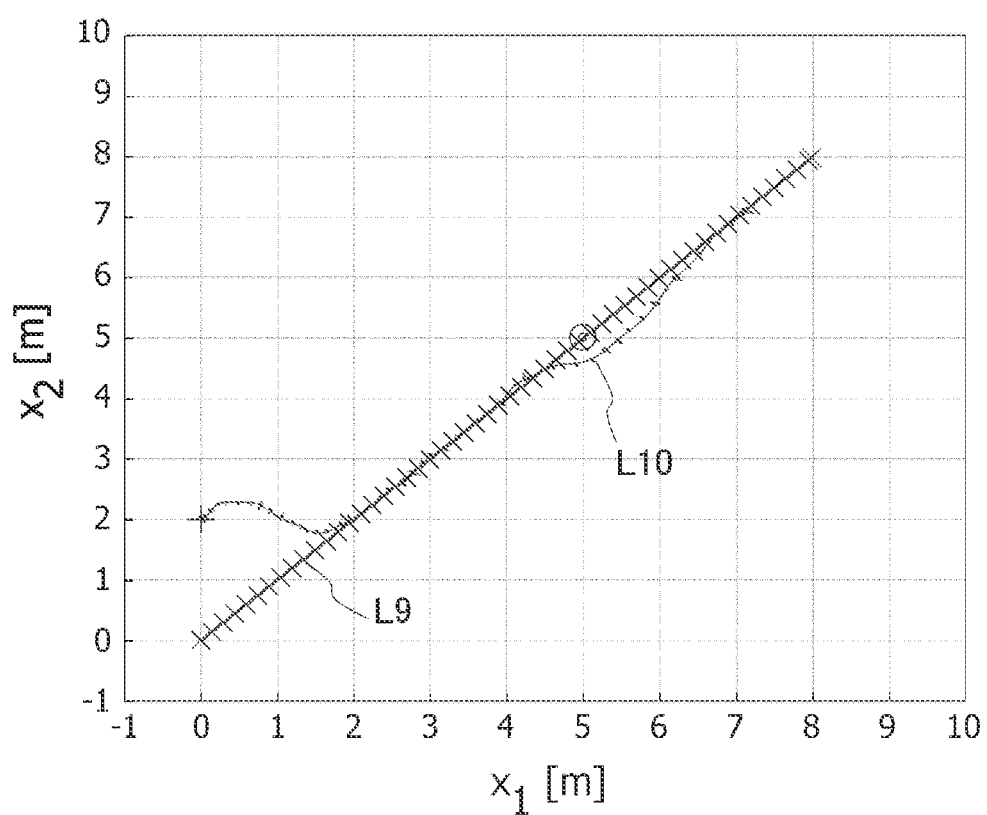
FIG. 16 is a diagram illustrating results of followability when servo control of a real plant having two control axes is performed using the servo driver of the fourth embodiment.

Simulation results when the servo driver 4 configured to have the real plant 6 including two control axes as a servo control object, as described in the first embodiment, is configured to correspond to the extended plant shown in FIGS. 15A and 15B are shown in FIG. 16. Simulation conditions are the same as those in the case of the simulation results shown in FIGS. 5A and 5B. In FIG. 16, a target command trajectory is represented by a line L9 and a trajectory of the output of the real plant 6 which is a result of servo control of the servo driver 4 is represented by a line L10 in a task coordinate system in which the output of a first control axis is set to the horizontal axis and the output of a second control axis is set to the vertical axis. As can be ascertained from FIG. 16, suitable following of the target command is realized while effectively suppressing vibration in the output of the real plant 6 by employing the prediction model represented by Equation 26 or Equation 28 and the weighting factors Q and R for the model predictive control unit 43.

MODIFIED EXAMPLE

The servo integrator described in the aforementioned third embodiment may be applied to the servo driver 4 of the present embodiment, the deviation e (r−θ) between the target command r and the output θ of the real plant 6 may be added to the extended state variables, and an integral term represented by a product of the deviation e (r−θ) and the predetermined integral gain $K_i$ may be included in a prediction model of the model predictive control unit 43. According to this configuration, it is possible to realize suitable following of the target command r while suppressing both vibration in the output of the real plant 6 and the quantity of overshoot, as shown in FIG. 13.

REFERENCE SIGNS LIST

1 Network
2 Motor
3 Load device
4 Servo driver
4' Control device
5 Standard PLC
6 Plant
7 Filter unit
41 Servo integrator
42 State acquisition unit
43 Model predictive control unit
60, 62, 66, 68 Extended plant
61, 65 Integrator

The invention claimed is:

1. A control device for causing an output of a predetermined control object comprising a real plant including a servo motor and load to follow a predetermined target command, the control device comprising a processor configured to perform operations comprising:
   operation as a filter unit which performs an attenuation process at a predetermined frequency in response to a control input based on the predetermined target command and forms a virtual extended control object comprising an extended plant together with the predetermined control object; and
   operation as a model predictive control unit comprising a prediction model defining a correlation between predetermined extended state variables with respect to the virtual extended control object and the control input to the virtual extended control object in the form of a predetermined state equation, and which performs model predictive control based on the prediction model in response to the predetermined target command according to a predetermined evaluation function in a prediction interval having a predetermined duration, and outputs a value of the control input at at least an initial time of the prediction interval, wherein
   the prediction model defines a correlation between the control input and the predetermined extended state variables including a state variable related to the predetermined control object and a predetermined filter state variable related to the filter unit, and
   the predetermined evaluation function is configured to calculate a state quantity cost comprising a stage cost with respect to state variables except the predetermined filter state variable among the predetermined extended state variables, and a control input cost comprising a stage cost related to the control input.

2. The control device according to claim 1, wherein the processor is configured to perform operations such that the filter unit is configured as a notch filter having the predetermined frequency as a center frequency of the attenuation process or a low pass filter having the predetermined frequency as a cutoff frequency in the attenuation process.

3. The control device according to claim 1, wherein
   the control input is a jerk input with respect to the predetermined control object,
   the virtual extended control object includes an integrator which performs a predetermined integration process in response to the jerk input in addition to the predetermined control object and the filter unit,
   the prediction model defines a correlation between the jerk input and the predetermined extended state variables including a state variable related to the predetermined control object, a state variable related to the filter unit, and a state variable related to the integrator, and
   the predetermined evaluation function is configured to calculate the state quantity cost with respect to state variables except the predetermined filter state variable among the predetermined extended state variables, and the control input cost related to the jerk input.

4. The control device according to claim 3, wherein
   the predetermined evaluation function is configured to calculate the state quantity cost as zero irrespective of the predetermined extended state variables.

5. The control device according to claim 1, further comprising:
   a servo integrator to which a deviation between the predetermined target command and the output of the predetermined control object is input, wherein
   the state variable related to the predetermined control object includes a predetermined integral term represented by a product of the deviation and a predetermined integral gain, and the prediction model defines a correlation between the predetermined extended state variables including the predetermined integral term and the control input.

6. A control device for causing an output of a predetermined control object comprising a real plant including a servo motor and load to follow a predetermined target command, the control device comprising a processor configured to perform operations comprising:
- operation as an integrator which performs a predetermined integration process on a jerk input that is a control input based on the predetermined target command and forms a virtual extended control object comprising an extended plant together with the predetermined control object; and
- operation as a model predictive control unit which has a prediction model defining a correlation between predetermined extended state variables with respect to the virtual extended control object and the jerk input to the virtual extended control object in the form of a predetermined state equation, receives the predetermined target command, performs model predictive control based on the prediction model according to a predetermined evaluation function in a prediction interval having a predetermined duration, and outputs a value of the jerk input at at least an initial time of the prediction interval, wherein the prediction model defines a correlation between the jerk input and the predetermined extended state variables including a state variable related to the predetermined control object and a state variable related to the integrator, and the predetermined evaluation function is configured to calculate a state quantity cost that is a stage cost with respect to the predetermined extended state variables and a control input cost that is a stage cost related to the jerk input.

* * * * *